April 20, 1954     H. G. ENGLISH     2,675,678
BRAKE AND BRAKE ACTUATING MECHANISM
Filed March 11, 1950     3 Sheets-Sheet 1
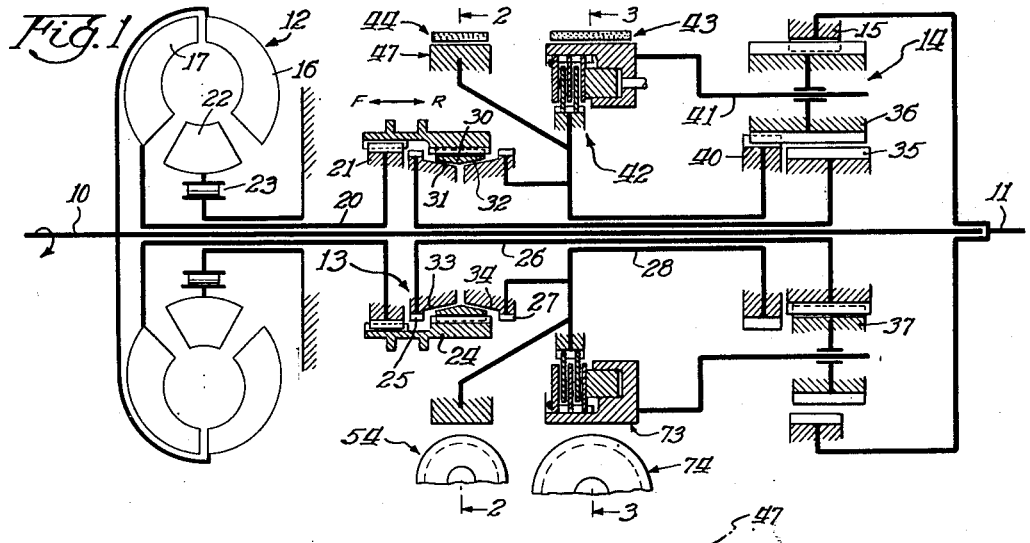
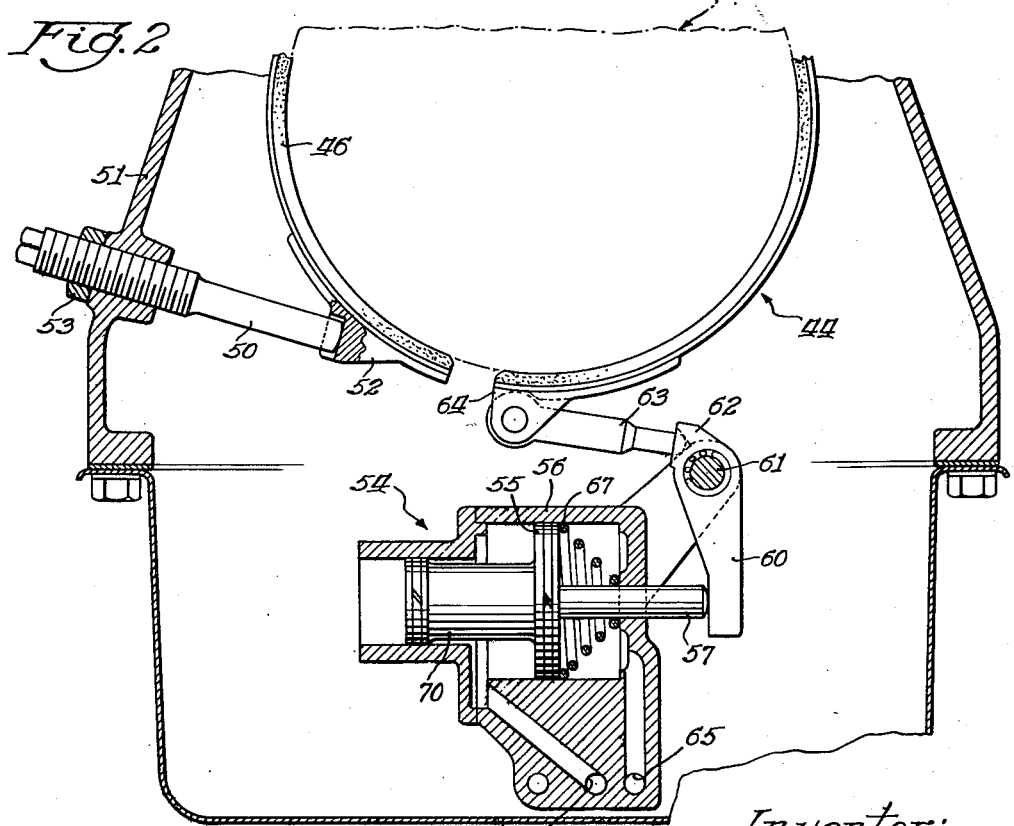
Inventor:
Herdis George English

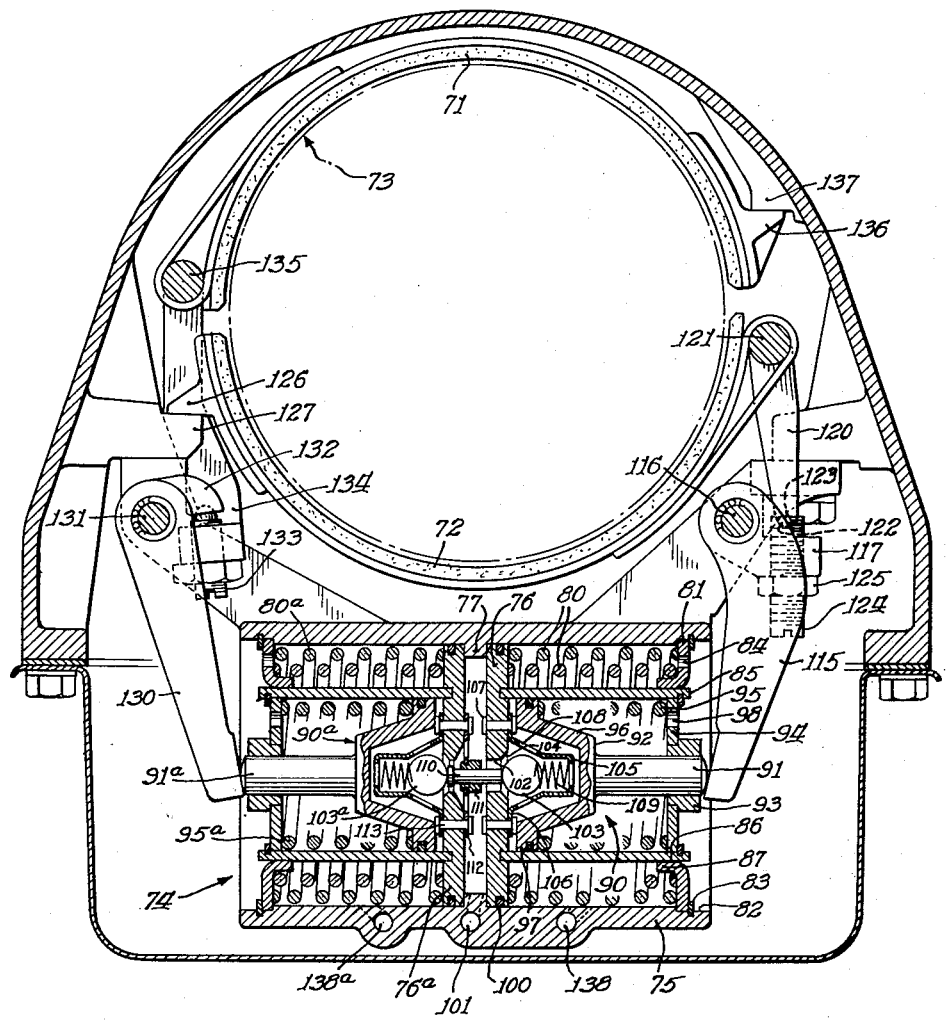

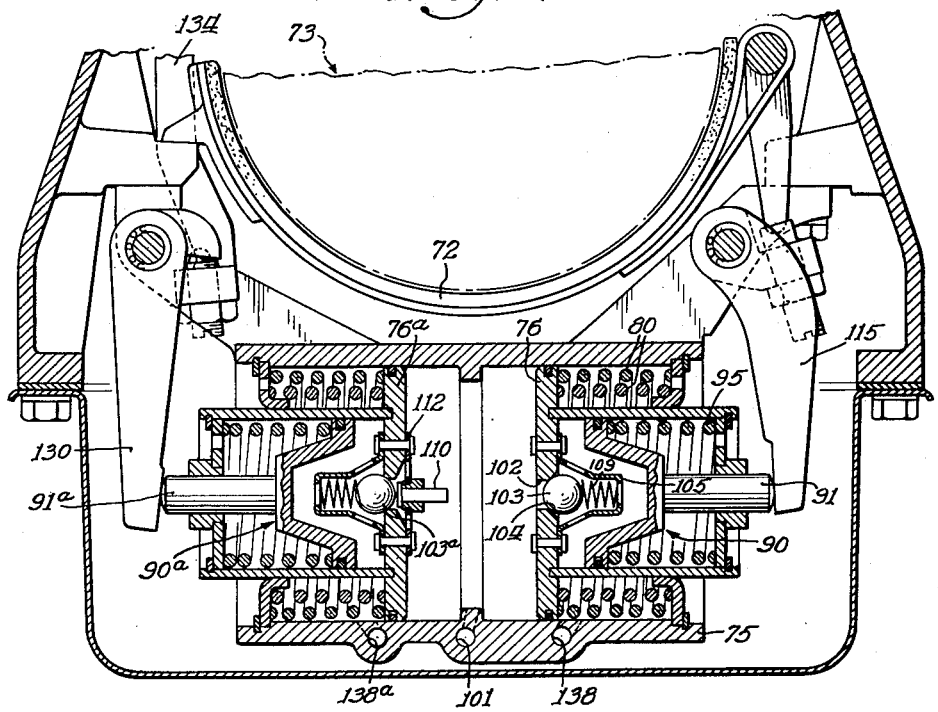
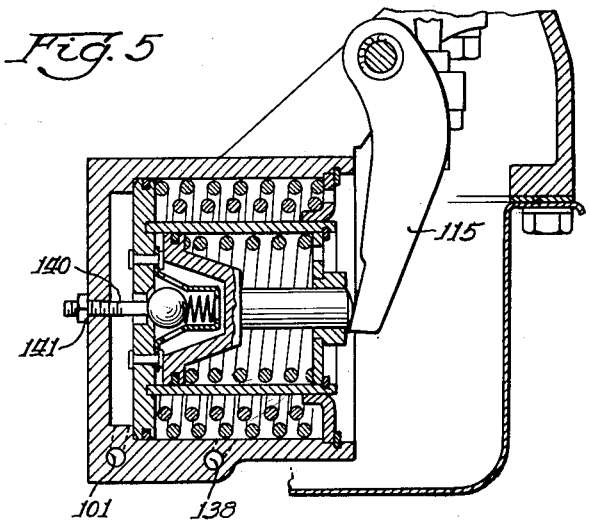

UNITED STATES PATENT OFFICE 2,675,678

BRAKE AND BRAKE ACTUATING MECHANISM

Herdis G. English, La Grange, Ill., assignor to Borg-Warner Corporation, Chicago, Ill., a corporation of Illinois Application March 11, 1950, Serial No. 149,049

1 Claim. (Cl. 60—97)

This invention relates to transmissions, and more particularly to brakes and brake actuating mechanisms for transmissions and the like.

One of the primary problems in the design of brake mechanisms is the avoidance of unbalanced shaft loads when the brake mechanism is engaged. This problem is particularly acute with transmissions of the type employing planetary gear sets where the brake mechanism may be employed for holding one of the elements of the planetary gear set to cause it to serve as a reaction member. Where such transmissions are employed for automobiles, they must be made very compact and, consequently, bearing sizes are restricted. Thus, any unbalanced bearing load will tend to cause rapid deterioration of the bearings. While this problem is particularly acute in the automatic transmissions, it is also present in varying degrees with any shaft to be held by a drum type brake. A further problem is that of providing a controlled engagement of the brake itself. This, again, is particularly important in automatic type transmissions where a sudden engagement of the brakes may produce a lurch and, consequently, undesirably rough operation of the transmission. Controlling brake engagement becomes increasingly difficult as the brake bands wear, since while with ordinary braking mechanisms it is feasible to provide an initial controlled rate of engagement, as the brake bands wear and become looser, the controlled area of engagement is, in effect, displaced with reference to the engaging points.

An object of the present invention is to provide a new and improved braking mechanism and more particularly one in which unbalanced bearing loads are held to a minimum.

A further object of the present invention is to provide a brake mechanism in which provision is made for providing a cushioned and controlled engagement of the brakes despite wear.

A more particular object of the present invention is to provide a brake actuating mechanism wherein provision is made for taking up slack prior to effecting braking engagement of the band with the drum.

In accordance with one embodiment of this invention a suitable braking mechanism may comprise a pair of oppositely disposed brake bands arranged to engage opposite sides of a brake drum and individually actuated by hydraulic servo motors. The servo motors are supplied with energizing pressure from the same source and apply equal engaging pressures so that the bands engage with equal pressure and at the same time. In addition, the servo motors are each designed to provide a two-phase operation so that in the first phase the slack is taken up and the brake band moved to engaging position, and in the second phase the brake is actually engaged under the controlled hydraulic pressure.

Other objects and advantages of the present invention will be apparent from the following detailed description thereof taken in conjunction with the drawings wherein:

Fig. 1 is a schematic view of a transmission suitable for use in an automotive vehicle and illustrating the use of brake mechanisms in conjunction therewith;

Fig. 2 is a transverse, sectional view of a conventional brake mechanism, the view being taken substantially along the line 2—2 of Fig. 1;

Fig. 3 is a transverse, sectional view of a dual brake mechanism in accordance with the present invention, the view being taken substantially along the line 3—3 of Fig. 1;

Fig. 4 is a detail, sectional view showing particularly the servomotor mechanism, the mechanism being shown in the position in which the brakes are engaged; and Fig. 5 is a transverse, sectional view showing the right servomotor of Fig. 3 arranged to provide the sole actuating force.

Referring first to Fig. 1, wherein an automatic type transmission is illustrated in which the novel brake mechanism of this invention may be employed, it will be seen that this transmission includes an input or driving shaft 10, located at the left side of the transmission, and an output or driven shaft 11, located at the right side of the transmission. The input shaft 10 is connected through a torque converter 12, of generally conventional design, to a clutch 13 shiftable to either of two positions, and through the two-position clutch 13 to a compound planetary gear set 14, the ring gear 15 of which is splined to the output shaft 11.

Referring more particularly now to the torque converter 12, this comprises an impeller or pump 16 connected to the input shaft 10 and arranged to drive a turbine 17 mounted on the left end of an intermediate shaft 20, the right end of which has fixed thereto a spur gear 21, forming a part of the two-position clutch assembly 13. A stator 22 is associated with the torque converter 12 and is supported on a one-way brake 23 whereby rotation of the stator freely in the forward direction, that is, the direction in which the shaft 10 is normally turned, is permitted, but the stator is prevented from rotating in the reverse direction, thus permitting it to serve as the reaction member of the torque converter.

The two-position clutch 13 comprises an internally toothed, axially shiftable sleeve 24 driven with the shaft 20 by the spur gear 21. The sleeve 24 is shiftable to the left to engage with clutch teeth 25 formed on a sleeve shaft 26 and is shiftable to the right to engage with clutch teeth 27 formed on a second sleeve shaft 28. As will be hereinafter described in greater detail, the sleeve 24 when moved to the left to engage with the teeth 25 functions to condition the planetary gear set 14 for forward drive, and when moved in the opposite direction engage with the teeth 27, functions to condition the planetary gear set for reverse drive. In the position illustrated, the transmission is in neutral, the clutch sleeve 24 being engaged with neither the teeth 25 nor the teeth 27. A synchronizer ring 30 having tapered surfaces 31 and 32 is disposed within the sleeve 24, and these synchronizing surfaces are adapted to cooperate with tapered surfaces 33 and 34 on the shafts 26 and 28, respectively, to effect synchronization thereof with shaft 20, the synchronizer ring being moved to the left or the right to synchronize either the shaft 26 or the shaft 28 with the shiftable sleeve 24 so that the sleeve 24 may be brought into engagement either with the teeth 25 or the teeth 27 without clash. The action of the synchronizer is substantially conventional and any suitable synchronizing means may be employed to prevent gear clashing.

Referring now to the planetary gear set 14, it will be seen that in addition to the ring gear 15, the planetary gear set includes a rear sun gear 35 splined to the forward shaft 26, a first set of planet gears 36 in mesh with the ring gear and a second set of planet gears 37 in mesh with the planet gears 36 and with the sun gear 35. The planet gears 36 are made substantially longer than the planet gears 37, and the planet gears 36 mesh adjacent their left ends with a front sun gear 40 splined to the shaft 28. The planet gears 36 and 37 are carried by a planet carrier 41, rotatably suported with respect to the shafts 10, 26 and 28.

A friction clutch 42 is provided for connecting the planet carrier 41 and the shaft 28 to rotate in unison, thereby causing the front sun gear 40 to rotate with the carrier 41. A brake 43 is also provided for holding the carrier 41 stationary to serve as a reaction member for the planetary gear set. A second brake 44 is provided for holding the shaft 28 stationary to cause the front sun gear 40 to serve as a reaction member for the planetary gear set.

These brakes and the clutch may be actuated through any suitable control mechanism as, for example, that shown in the earlier filed application of Youngren, et al., Serial No. 25,064, filed May 4, 1948, wherein a transmission of the type here under consideration is described in greater detail together with a suitable hydraulic control mechanism.

Low speed forward drive through the transmission is completed by first shifting the shiftable clutch sleeve 24 to the left to establish forward drive and then engaging the low range brake 43 to hold the carrier 41 stationary. The low speed forward drive is then through the shaft 26, the rear sun gear 35, the planet gears 37 and 36 and the ring gear 15 connected to the output shaft 11. In low forward speed drive, as in all the other drive ratios provided by the transmission, the torque converter 12 is a part of the power train and all the power transmitted from the drive shaft 10 to the output shaft 11 passes through the torque converter.

The transmission may be shifted from low speed forward drive to second or intermediate speed forward drive by engaging the brake 44 and releasing the brake 43. Brake 44 holds shaft 28 stationary, thus causing the front sun gear 40 to serve as a reaction member for the planetary gear set. In this intermediate speed ratio, the drive is through the shaft 26, the rear sun gear 35, the planet gears 37, the planet gears 36 and the ring gear 15, the planet gears 36 causing the planet carrier to rotate about the stationary sun gear 40.

High speed forward or direct drive is obtained by disengaging the brake 44 and engaging the friction clutch 42 to lock together the planet carrier 41 and the sun gear 40 so that the parts of the planetary gear set will all rotate as a unit. The driven shaft 11 then rotates at a one-to-one drive with respect to the shaft 26.

The transmission is conditioned for reverse drive by moving the clutch sleeve 24 to the right into engagement with the gear teeth 27, thereby coupling the shaft 28 with the shaft 20 driven by the turbine 17. The brake 43 is again engaged to hold the planetary carrier 41 stationary, and the drive is then through the front sun gear 40, the long planet pinions 36 and the ring gear 15.

From the foregoing, it will be apparent that the brake 44 which is employed only for intermediate ratio forward drive is subjected to a lesser torque load than is the brake 43 which is employed both for low speed forward drive and for reverse drive. It has been found desirable in some cases, therefore, to employ different types of brakes for the intermediate brake and for the low speed and reverse brake. Thus, for the intermediate brake a relatively simple mechanism, such as that shown in Fig. 2, may be employed, whereas in order to withstand the greater torque loads imposed in low speed forward drive and in reverse drive, a different and more complex type of brake assembly may be employed for the brake 43, such as that illustrated in Fig. 3 of the drawings.

Referring first to Fig. 2, wherein a suitable brake mechanism for the brake 44 is illustrated, it will be seen that this mechanism comprises a friction brake band 46 encircling a drum 47 fixed to shaft 28. The band 46 is anchored at its left side by means of an adjustable anchor rod 50, the left portion of which is threaded into the wall 51 of the transmission housing. The right end of anchor rod 50 bears against an anchor lug 52 fixed to or integrally formed with the brake band 46. By threading the anchor rod 50 into the transmission housing, the band 46 may be made to fit more closely around the drum 47, or vice versa, by threading the anchor rod 50 out of the transmission housing, the band may be loosened. A lock nut 53 is provided for holding the anchor in adjusted position.

Engagement of the brake band 46 is controlled through a hydraulic servo mechanism designated generally at 54, this mechanism comprising essentially a piston 55 slidably journalled in a cylinder block 56 and having affixed to the right side thereof and extending axially to the right therefrom, a piston rod 57. Piston rod 57 extends through the right wall of the cylinder block 56, and its right end bears against the lower left side of a lever arm 60 pivotably supported at its upper end portion on a post or pivot shaft 61, forming a fulcrum for the lever arm 60. The portion 62 of the lever arm 60 extending above the post 61 is indented on its left side to receive the right end of a strut 63, the left end of which is pivotably secured to a lug 64 mounted on the opposite end of the brake band 46 from the anchor lug 52. Upon the lever arm 60 being pivoted in a counterclockwise direction by shifting piston 55 to the right, the strut 63 will move to the left, causing the brake band 46 to be wrapped more tightly around the drum 47. The brake assembly is preferably arranged so that the reaction torque on the drum 47 tends to cause the brake band 46 to wrap more tightly around the drum 47, in effect, providing a self-energizing action.

Movement of the piston 55 to control the positioning of the lever arm 60 is effected by admitting fluid pressure through either the right or release port 65, to disengage the brake, or through the left or engage port 66, to cause engagement of the brake. Admitting fluid pressure through the left port 66 applies pressure to the left side of the piston 55, thereby moving the piston 55 to the right against the pressure of a return spring 67 disposed within the right portion of the cylinder 56, so as to exert spring pressure against the right side of the piston 55. It will be noted that a guide shaft 70 is provided on the left side of piston 55 and is journalled in a suitably formed left portion of the housing 56, this guide shaft 70 serving to maintain axial alignment of the piston with respect to the cylinder in which the piston is journalled.

When it is desired to release the brake, the port 66 is connected to the sump or other low pressure zone so as to vent the left side of the piston chamber and pressure may then be admitted through the disengaging or release port 65 to move the piston 55 positively to the left to release the brake band.

This type of brake is capable of withstanding substantial amounts of torque, but due to the method of application of the brake band, under very high torque loads, the bearing loads may be unbalanced, resulting in undue wear and, furthermore, under very high torque loads the brake may not be completely effective. Thus, where high torque loads are present, as in low or reverse drives, the novel brake mechanism disclosed in Fig. 3 and forming the primary subject matter of this invention may be employed.

Referring now to Fig. 3 wherein a brake suitable for holding the planetary gear set in low or reverse ratio is illustrated and corresponding to the brake 43 in Fig. 1, it will be seen that this brake mechanism comprises not one but two oppositely disposed brake bands 71 and 72. These brake bands are both engageable with a drum designated generally as 73, and which is, in Fig. 1, secured to the planetary carrier 41. Since the holding forces exerted by the brake bands 71 and 72 are applied to opposite sides of the drum 73, it will be evident that it is essential that these brake bands be applied simultaneously and with equal force. The dual servo mechanism, designated generally at 74, accomplishes this and, in addition, provides for a two-phase application of the brake bands, the bands being moved to engaging position in the first or slack take-up phase and then actually engaged in the second phase.

The servo mechanism 74 is located in a chambered housing 75 which is preferably of cylindrical configuration and is made sufficiently heavy to withstand the hydraulic pressures to which it must be subjected in use, the housing 75 being, in turn, mounted within the transmission housing 51. As the two servo mechanisms are substantially identical, only one will be described in detail, the description of the one being equally applicable to the other.

The right servo mechanism for actuating the lower brake band 72 comprises a heavy, annular piston plate 76 slidably journalled in the right portion of housing 75 and when at rest position bearing against the right side of an annular ridge 77 formed on the inner side of the mid-portion of housing 75. The piston 76 is urged to this rest position by a pair of helically coiled springs 80, the left ends of which bear against the right side of piston plate 76, and the right ends of which bear against a retainer member or ring 81 fitted within a slightly recessed portion 82 at the right end of housing 75 and held in the recessed portion 82 by a split ring 83. It will be noted that an aperture or port 84 is formed through the upper portion of the retainer ring 81, as viewed in this figure, this port being provided to prevent hydraulic lock of the piston 76, that is, to permit escape of air or fluid trapped between the piston plate and the retainer plate when the piston is moved to the right, and also to permit air or fluid to enter the piston chamber when the piston is moved to the left.

A sleeve or short tube 85 is disposed coaxially within the housing 75, and is mounted at its left end on the right side of piston plate 76. The right end of sleeve 85 is journalled through the central aperture 86 in the retainer ring 81, the central portion of retainer ring 81 being provided with a flange 87 which extends axially to the left to form a bearing surface for supporting the right portion of the short tube 85. Tube 85 forms a second piston chamber in which is slidably disposed a secondary piston assembly 90, employed to provide an initial slack take-up of the brake band 72.

The piston assembly 90 comprises a piston shaft 91, which extends to the right from a flat, base portion 92 of the piston and the right end portion of the shaft 91 is journalled through a bushing 93. The bushing 93 is mounted in an annular retainer plate 94 which, in addition to serving as a mounting member for the bushing 93, also serves to retain a spring 95 within the piston chamber defined by the tube 85, the spring 95 being used to urge the piston 90 to the left. A port 98 is provided in retainer plate 94, similar to port 84, to prevent fluid lock of the piston 90. A frusto-conical portion 96 is joined at its smaller or right end to the left side of plate 92 and has a flanged portion 97 at its left or larger end, the periphery of which is closely fitted to the inner wall of the sleeve 85 and is provided with a seal ring to prevent escape of fluid thereby.

When fluid pressure is supplied to the servo motors, the pressure, entering through a port 101 formed in the motor housing 75, passes through the central aperture 102 provided in the annular piston 76, and is exerted against the left side of piston 90, urging the piston shaft 91 to the right against spring 95. This provides the initial slack take-up and the spring 95 is made relatively weak as compared to springs 80 to permit movement of the piston 90 prior to movement of the primary piston 76. That is to say, a given pressure applied to pistons 76 and 90 will cause piston 90 to move in advance of piston 76. As the pressure builds up against the piston 90 and consequently against the piston 76, the piston 76 also will tend to move to the right. In order to cause the piston 90 to move in unison with the piston 76, there is provided a poppet valve assembly whereby pressure acting against the piston 90 is trapped and prevented from escaping after initial movement of piston 76. More specifically, the poppet valve assembly comprises a poppet ball member 103 which is adapted, upon sufficient movement to the right of piston 76, to seat on a poppet seat 104 provided by bevelling the right entrance to the aperture 102 formed through the piston 76. The poppet ball 103 is supported within the left conical portion of the piston 90 by a retainer cage 105 of frusto-conical configuration and having a flanged base portion 106 secured to the right side of the annular primary piston 76 by a plurality of rivets or bolts 107. As more clearly shown in Fig. 4, the sides and right end of the cage 105 are apertured at 108 to permit ready passage of fluid pressure therethrough, the cage serving only as a support for a loading spring 109, carried within the right portion of the cage. Loading spring 109 urges the poppet ball 103 toward the seat 104.

In the rest position of the servo mechanism, the poppet ball 103 is prevented from seating by a spacer pin 110 which is carried by a bushing 111 in turn supported on the annular primary piston 76-a of the left servo mechanism, the pin being freely axially movable in the bushing 111. Whether the spacer pin 110 be supported on the right or left primary piston is a matter of choice and the spacer pin only functions to prevent premature seating of the poppet balls associated with the two assemblies. Spider plate 112 supports the bushing 111 on the primary piston 76-a, the spider 112 being fixed to the right side of the piston 76-a at its periphery by a plurality of bolts or rivets 113.

Upon the pressure increasing, that is, building up within the mid portion of the servo motor housing sufficiently, the primary pistons 76 and 76-a will be moved in opposite directions. This initial movement of the primary pistons permits the poppet balls 103 and 103-a to seat, thereby sealing or trapping pressure against the pistons 90 and 90-a. By trapping the pressure against the pistons 90 and 90-a, these pistons are prevented from moving relatively to their associated primary pistons 76 and 76-a, respectively. Thus, continued application of pressure to the primary pistons will cause the primary and secondary pistons of each servo motor to move as a unit away from the center of the housing 75.

In the detail view provided in Fig. 4, the relative positions of the parts after the poppet balls 103 and 103-a have seated are allustrated. It will be seen that the spacing between the two popet balls is substantially greater than the length of the spacer pin 110. The length of the spacer pin 110 is selected so that the spacing between the poppet balls 103 and 103-a will exceed the length of the spacer pin during the initial fractional movement of the primary pistons so that thereafter the primary and secondary pistons will move in unison.

Brake engaging force is applied to the brake band 72 from the piston shaft 91 through a lever arm 115, the lower end of which is engaged by the right end of piston shaft 91. Lever arm 115 is pivotally supported adjacent its upper end on a stub shaft or post 116 and has affixed thereto a short crank arm 117 which, when the lever arm 115 is moved in a counterclockwise direction, also moves in a counterclockwise direction to urge upwardly a strut 120 secured at its upper end to the right end of brake band 72 by a lug 121. The lower end of strut 120 is provided with a rounded tip portion 122 which is received in a notch or recess 123 in the upper end of a threaded member 124 carried by the short arm 117. By suitably threading the member 124 in the arm 117, the engagement of the brake band may be closely adjusted. A lock nut 125 is provided for holding the adjustment.

The left end of brake band 72 is provided with an anchor lug 126, which may be suitably secured thereto or integrally formed therewith, the anchor lug 126 being supported on a projection 127 integrally formed with the transmission housing. Thus, movement of the strut 120 upwardly with the left end of the brake band 72 held stationary will cause the brake band to wrap around the lower portion of the drum 73.

Engagement of the upper brake band 71 is effected in a generally similar manner by movement of the piston shaft 91-a to the left, the left end of shaft 91-a bearing against the lower end of a lever arm 130, the upper portion of which is pivotably supported on a stub shaft 131 carried by the transmission housing. Clockwise movement of the lever arm 130 causes a short crank arm 132, projecting to the right, to engage at its under side the upper end of a screw 133 similar to the shaft 124. The screw 133 is threaded in the lower end of a strut member 134, the upper end of which is secured to the left end of upper brake band 71 by a lug 135. The right end of brake band 71 is provided with an anchor lug 136 which bears against a projecting member 137 secured to the right inner side of the housing wall of the transmission. Thus, clockwise movement of the lever arm pulling the strut 134 downward will cause the upper brake band 71 to be wrapped more tightly around the drum 73.

Since the pressures applied to the two servo motors are the same, are applied simultaneously and the servomotors are made substantially identical, it will be evident that pressure of engagement is equal and simultaneous for both bands. Thus, the shaft load is balanced, that is to say that the shaft on which the drum 73 is supported, which forms a part of the transmission, is subjected to equal brake engaging pressures on either side. This arrangement results in considerably increased life for the bearings and bushings associated with the shaft and transmission. At the same time, it has been found that the brake mechanism in accordance with Figs. 3 and 4 enables the application of much higher braking forces without undue increase in the size of the mechanism.

Disengagement of the brake bands may be effected in either of two ways. Thus, by releasing the pressure applied through the port 101, through a suitable control valve (not shown), the return springs 80 and 95 associated with the right servo motor and the return springs 80-a and 95-a associated with the left servo motor will be effective to move the piston assemblies toward the center of the servo motor housing, thus withdrawing the piston shafts 91 and 91-a. Where a more rapid disengagement is desired, it is also feasible to supply pressure to the outer sides of the primary pistons 76 and 76-a through ports 138 and 138-a. Application of pressure through these ports and simultaneous release of pressure through the port 101 will cause rapid return of the primary pistons to the rest position. As the primary pistons approach the rest position, the spacing between the poppet balls 103 and 103-a will decrease until the spacer pin 110 becomes effective to unseat these poppet balls, thus permitting the secondary pistons 90 and 90-a to move inwardly relatively to the primary pistons 76 and 76-a, and completely releasing the brakes.

While this invention has been described as a dual servo motor system, a single servo motor system may be provided employing the principles of this invention. Thus, referring to Fig. 5, it will be seen that in order to adapt the right servo mechanism to provide the sole actuating force as, for example, to be used in place of the single servo mechanism 54 illustrated in Fig. 2, the only change necessary is that of mounting a spacer pin 140 corresponding in function to pin 110 of Figs. 3 and 4, on the servo motor housing end wall, the housing being made considerably shorter due to the elimination of the left servo motor. The pin would preferably be made adjustable, as by threading the pin into the end wall, as shown in Fig. 5, to provide for adjustment thereof with respect to the poppet ball. A lock nut 141, carried by the portion of 140 outside the housing wall is employed to hold the pin in adjusted position. Where no adjustment is required, the pin may be made integral with the end wall. In all other respects, the operation and arrangement of parts is identical to that illustrated in Figs. 3 and 4.

Further, while this invention has been described primarily in conjunction with a brake for use with a planetary gear type transmission, it will be evident that the features of this brake make it readily adaptable to many other uses and particularly those wherein it is desirable to avoid unbalanced shaft loads and/or to provide a slack take-up mechanism to facilitate control of the application of the brakes, that is, control of the engagement of the brake bands with the drum.

Where herein the various parts of this invention have been referred to as being located in a right or a left position, it will be understood that this is done solely for the purpose of facilitating description and that such references relate only to the relative positions of the parts as shown in the accompanying drawings.

What is claimed is:

In a servo motor, a first pair of pistons, a pair of take-up pistons respectively disposed coaxially of and within a sleeve carried by each of said first pistons and capable of relative axial movement with respect to the first pistons, resilient means for restraining movements of the first pistons away from each other, resilient means confined within the sleeves for restraining movements of the take-up pistons away from each other, said second named resilient means providing substantially lesser restraining forces than said first named resilient means, means for applying fluid pressure simultaneously to the first pair of pistons and the take-up pistons, the fluid pressure reaching the take-up pistons through apertures formed in the center of each of said first pair of pistons, a valve seat on the side of each of the first pair of pistons which faces the take-up piston disposed within the sleeves carried by the respective first pair of pistons and positioned around the periphery of the apertures, ball poppet valves for closing said apertures, a cage carried by each of said first pair of pistons, resilient means mounted within each of said cages for respectively biasing said ball poppet valves against the seats, and a spacer pin carried by one of the first pair of pistons for holding the ball poppet valves off of said seats, said spacer pin being so located with respect to said first pistons that after an initial movement of the first pistons in one direction the spacer pin becomes ineffective to prevent seating of the valves so that the valves are thereafter effective to trap fluid between the respective first pair of take-up pistons and prevent relative movement therebetween.

References Cited in the file of this patent

UNITED STATES PATENTS

| Number | Name | Date |
|---|---|---|
| 1,840,807 | Brown et al. | Jan. 12, 1932 |
| 1,865,105 | Houplain | June 28, 1932 |
| 1,932,685 | Black | Oct. 31, 1933 |
| 2,098,125 | Yoxall | Nov. 2, 1937 |
| 2,170,851 | Carroll | Aug. 29, 1939 |
| 2,227,245 | Carroll | Dec. 31, 1940 |
| 2,282,556 | Bowen | May 12, 1942 |
| 2,453,785 | Cousino | Nov. 16, 1948 |
| 2,513,015 | Fike | June 27, 1950 |

FOREIGN PATENTS

| Number | Country | Date |
|---|---|---|
| 521,980 | Great Britain | June 5, 1940 |